(12) United States Patent
Navarro, Sr. et al.

(10) Patent No.: US 7,356,935 B2
(45) Date of Patent: Apr. 15, 2008

(54) THREAD GAUGE WIRE APPARATUS

(76) Inventors: Joseph R. Navarro, Sr., 1991 Poarch Rd., Lincolnton, NC (US) 28092; Mariam M. Navarro, 1991 Poarch Rd., Lincolnton, NC (US) 28092

( * ) Notice: Subject to any disclaimer, the term of this patent is extended or adjusted under 35 U.S.C. 154(b) by 118 days.

(21) Appl. No.: 11/348,709

(22) Filed: Feb. 7, 2006

(65) Prior Publication Data

US 2007/0180920 A1    Aug. 9, 2007

(51) Int. Cl.
*G01B 3/40* (2006.01)
(52) U.S. Cl. .................................. 33/199 R
(58) Field of Classification Search ............. 33/199 R, 33/199 B, 501, DIG. 13, 501.11, 501.14, 33/501.15, 501.17
See application file for complete search history.

(56) References Cited

U.S. PATENT DOCUMENTS

| | | | | |
|---|---|---|---|---|
| 61,926 A | * | 2/1867 | Copeland | ................ 33/501 |
| 1,961,647 A | * | 6/1934 | Sonoda | ................ 33/199 R |
| 2,399,624 A | * | 5/1946 | Bunch | ................ 33/199 R |
| 2,443,820 A | * | 6/1948 | Gabbey | ................ 33/199 R |
| 2,466,490 A | * | 4/1949 | Simmons | ................ 33/199 R |
| 2,543,012 A | * | 2/1951 | Glanzer | ................ 33/199 R |
| 2,554,024 A | * | 5/1951 | Govoni | ................ 33/199 R |
| 2,555,964 A | * | 6/1951 | Gabbey | ................ 33/199 R |
| 2,620,569 A | * | 12/1952 | Scrivener | ................ 33/199 R |
| 2,622,337 A | * | 12/1952 | Ross | ................ 33/199 R |
| 2,663,948 A | * | 12/1953 | Scully | ................ 33/199 R |
| 2,817,153 A | * | 12/1957 | Jakubiak | ................ 33/199 R |
| 3,253,340 A | * | 5/1966 | Farnam | ................ 33/199 R |

\* cited by examiner

*Primary Examiner*—Christopher W Fulton
(74) *Attorney, Agent, or Firm*—Robert J. Yarbrough (57) ABSTRACT

A three-wire apparatus for measuring an external thread features a single length of wire having a first bend and a second bend, which first and second bend divide the single length of wire into first, second and third wire portions. The first, second and third wire portions engage an external thread and are measured using a micrometer or other measuring device. The single length of wire defines an open end for engaging the first, second and third wire portions with the external thread.

10 Claims, 9 Drawing Sheets

THREAD GAUGE WIRE APPARATUS

BACKGROUND OF THE INVENTION

1. Field of the Invention

The Invention is a wire apparatus for use in precisely measuring the pitch diameter of an external thread, such as a bolt or other threaded fastener. The wire apparatus is configured to allow gauge wire to contact the external thread at three locations. A person may hold the external thread in one hand and precisely measure the pitch diameter using a micrometer, caliper or other measuring device held in the person's other hand.

2. Description of the Prior Art

The accurate measurement of external threads, such as the threads appearing on a bolt, is a necessary part of fastener manufacture and also a necessary aspect of quality control for any operation involving assembly using threaded fasteners. A critical dimension of a threaded fastener is the pitch diameter. The "pitch diameter" for a straight thread is the diameter of an imaginary cylinder axially aligned with the threaded fastener and located where the width of the thread and the width of the space between adjacent threads are equal.

Several methods to measure pitch diameter are in use, including the use of three wires. To use the three-wire method, three wires of equal diameter are held against the external thread by a fixture. The diameter of the wires is selected to engage the thread at the expected pitch diameter of the external thread. The distance between the outside edges of the wires then is measured. The wires generally are held by table top or bench top-mounted fixtures that align the wires with the external thread and that hold the wires in engagement with the external thread. The fixtures generally include a micrometer mounted normal to the axis of the external thread for measuring the distance between the outside edges of the wires. Well-established mathematical formulae are used to determine the pitch diameter from the measurements thus obtained.

The three-wire method is frequently used as a precision measuring technique to check the accuracy of plug gauges or other reference thread gauges.

None of the prior art thread gauging methods includes configuring the wire to hold the three wires in engagement with the external thread without use of a fixture.

SUMMARY OF THE INVENTION

The invention is a wire apparatus that is configured to engage an external thread. For the purpose of this application, the term "external thread" means any object having external threads, such as a threaded rod, bolt, screw, stud, tube, pipe, or any other object or fastener having external threads. A unitary length of wire is bent to form three wire portions, each of which is substantially straight and each of which engages the external thread. Two of the wire portions engage the external thread at locations that are diametrically opposed to the location at which the remaining wire portion engages the external thread.

The diameter of the wire and the radii of the bends of the wire are selected so that two of the wire portions engage the flanks (as hereinafter defined) of the external thread on one side of the external thread and at substantially the expected pitch diameter. The remaining wire portion engages the flanks of the external thread at a location on the opposite side of the external thread from the first two locations.

The bends in the unitary length of wire and the material and dimensions of the wire are configured and selected so that the wire forms a resilient spring. The resilient nature of the wire apparatus allows the person to place the first, second and third wire portions into engagement with the flanks of the external thread and to measure the outside dimension of the wire portions formed by that engagement without applying excessive force to the wire portions. The resilient nature of the wire apparatus also allows the wire apparatus to be supported by the external thread without other fixtures. The wire apparatus resiliently conforms to variations in the thread such as "drunkenness," incorrect angle, poor surface finish and lead errors. The bends in the wire may be configured to apply a predetermined force to the external thread by the first, second and third wire portions to retain the wire apparatus in position on the external thread.

A person may use the measured pitch diameter of an external thread to determine whether, for example, the external thread meets production or purchase specifications or whether tooling producing the external thread is wearing out of adjustment and requires maintenance.

As an alternative embodiment, first, second and third wire portions may be separate lengths of a gauge wire. First, second and third wire portions are resiliently connected by a mounting block. The mounting block is configured to hold the wire portions in correct alignment. The materials from which the mounting block is composed are selected and the dimensions of the mounting block are selected so that the first, second and third wire portions are appropriately resilient. The resilient connection among the wire portions allows measurement of the outside dimension to be made without applying excessive force to the wire portions or to the measuring device. The resilient connection also allows the wire portions to be configured to apply a predetermined force to the external thread when the wire apparatus is engaged with the external thread, thereby retaining the wire portions and the mounting block on the external thread.

DESCRIPTION OF AN EMBODIMENT

Figure 1:
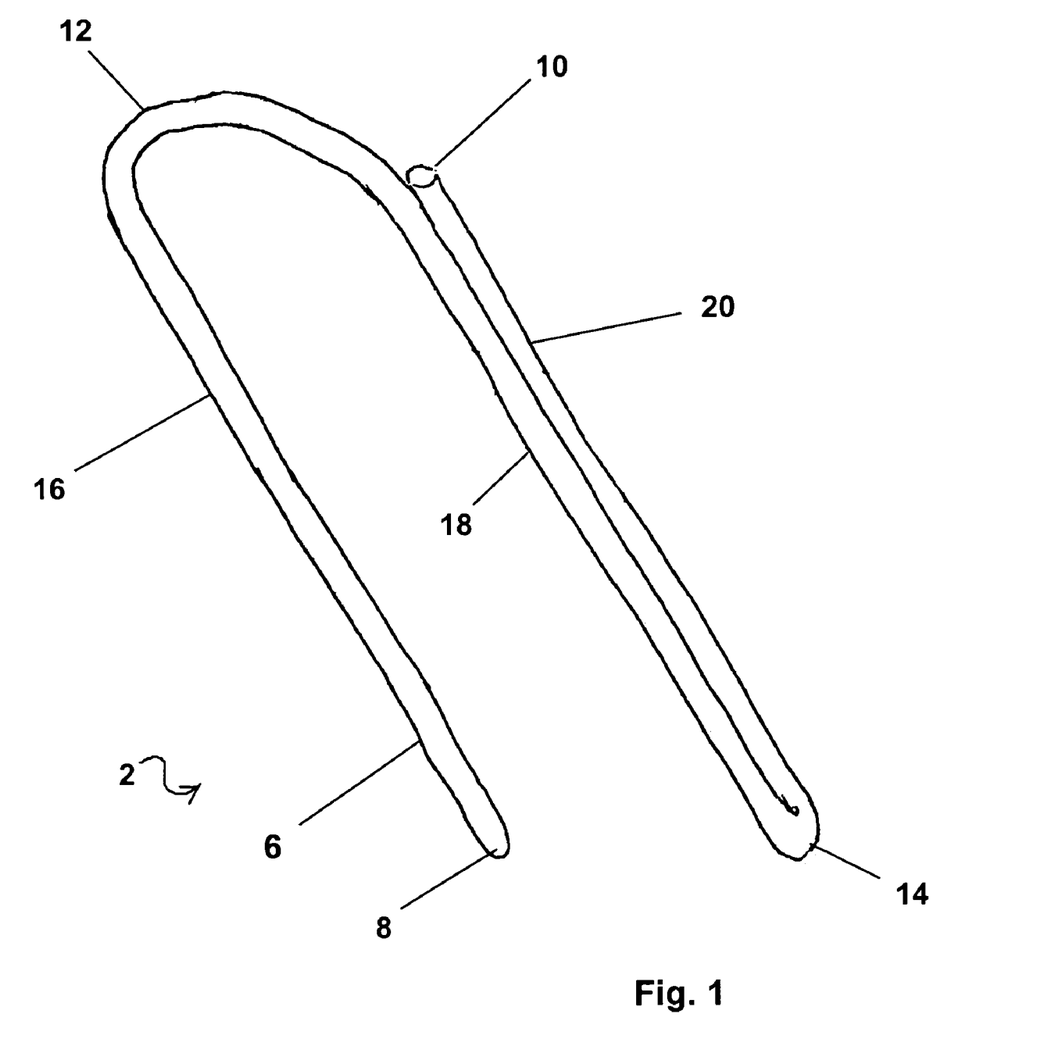
FIG. 1 is a perspective view of the Invention.
Figure 2:
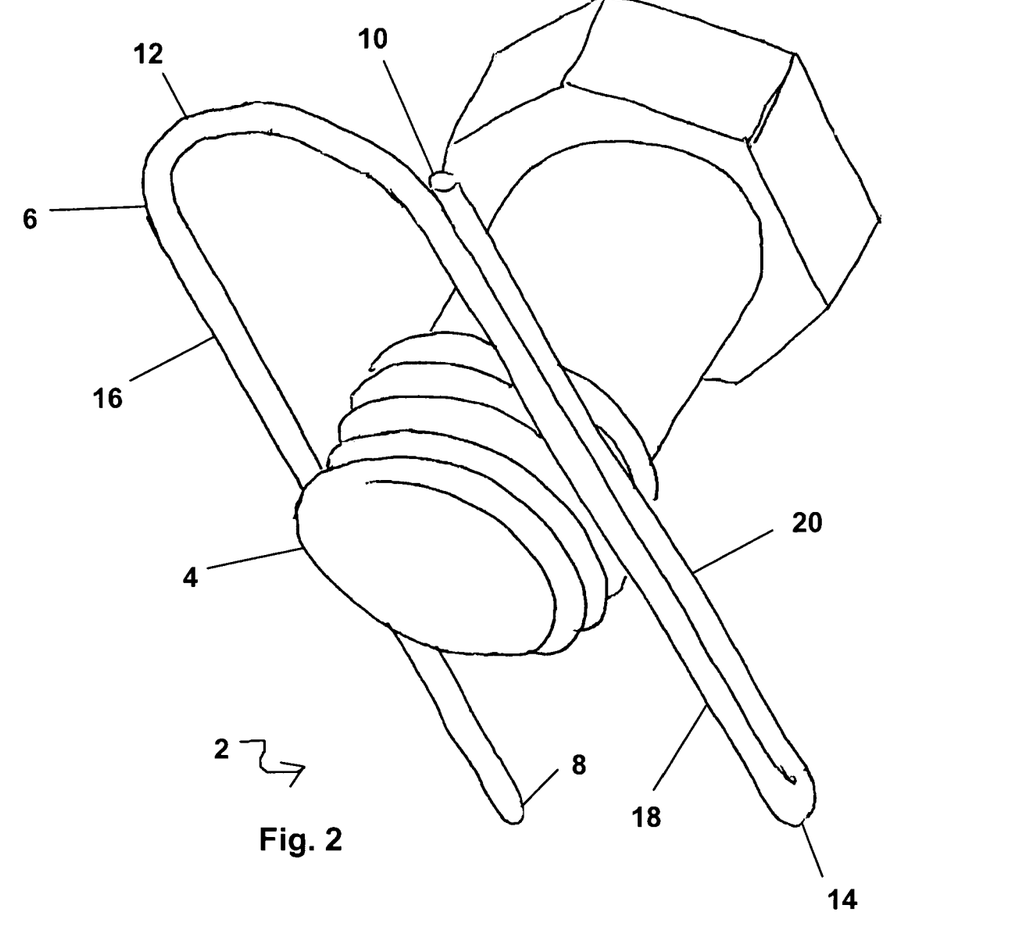
FIG. 2 is a perspective view of the invention in place on an external thread.

As shown by FIGS. 1 and 2, the Invention is a wire apparatus 2 for use in precision measuring of an external thread 4. The wire apparatus 2 is a single length of wire 6 having a first end 8 and a second end 10. The single length of wire 6 features a first bend 12 and a second bend 14. A first wire portion 16 is defined by first end 8 and first bend 12. A second wire portion 18 is defined by first bend 12 and second bend 14. A third wire portion 20 is defined by second bend 14 and second end 10. First wire portion 16, second wire portion 18 and third wire portion 20 are substantially straight and substantially parallel one to the others.

Figure 3:
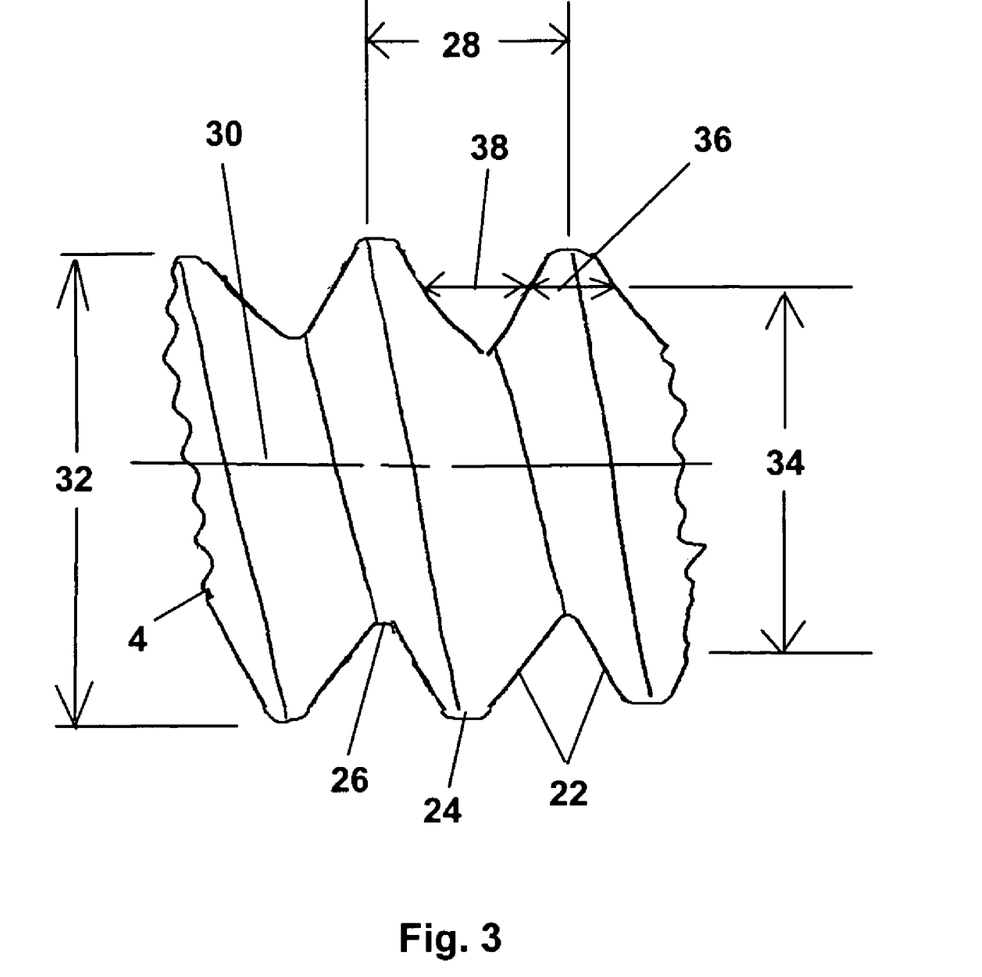
FIG. 3 is a detail view of an external thread.

As illustrated by FIG. 3 and as used in this application, the following terms have the following definitions:

The "flank" 22 of an external thread 4 is the helical face of the thread excluding the crest 24 and root 26 of the thread 6. The 'crest' 24 and 'root' 26 are the top surface joining the two flanks 22 of the thread 6 and the bottom surface joining two flanks 22, respectively.

The "pitch" 28 of an external thread 4 is the distance form a point on one thread to corresponding point on the next thread measured parallel to the external thread axis 30.

The "major diameter" 32 is the diameter of a virtual cylinder that touches the crest 24 of the external thread 4 with the external thread axis 30 as the center of the cylinder.

The "pitch diameter" 34 on the external thread 4 is the diameter of an imaginary cylinder with the external thread axis 30 as its center and at the surface of which the width 36 of the thread is equal to the width 38 of the space between the thread and an adjoining thread.

Figure 4:
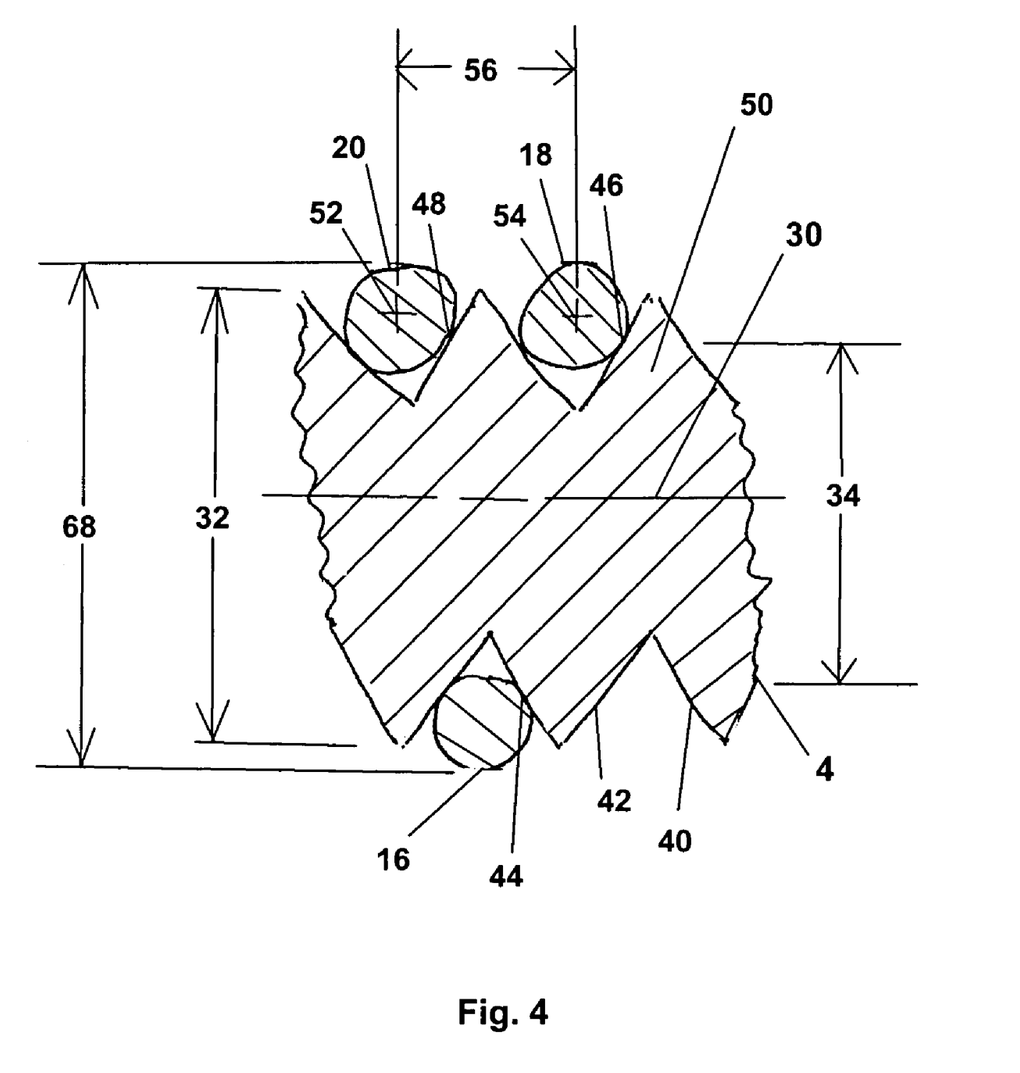
FIG. 4 is a detail cross section of the invention in place on an external thread.

As shown by FIGS. 2 and 4, the first, second and third wire portions 16, 18, 20 each has a diameter and the diameters are substantially equal. External thread 4 has a first flank 40 and a second flank 42. First and second flanks 40, 42 are helical. The first, second and third wire portions 16, 18, 20 and first bend 12 and second bend 14 are selected so that the first, second and third wire portions 16, 18, 20 will engage first flank 40 and second flank 42. First wire portion 16 contacts first flank 40 at first location 44. Second wire portion 18 contacts first flank 40 at second location 46. Third wire portion 20 contacts first flank 40 at third location 48.

Figure 5:
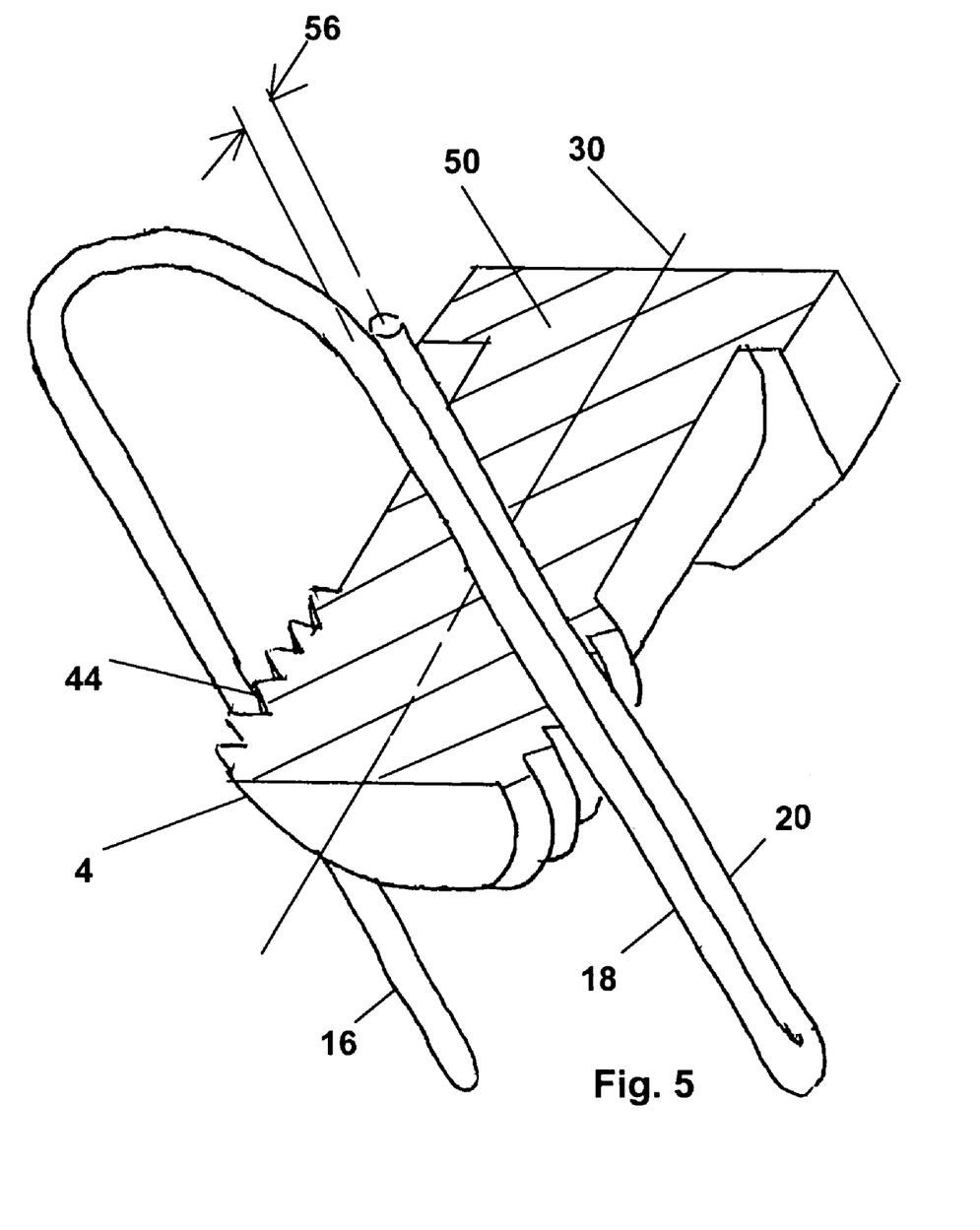
FIG. 5 is a partial cross section of the invention in place on an external thread.
Figure 6:
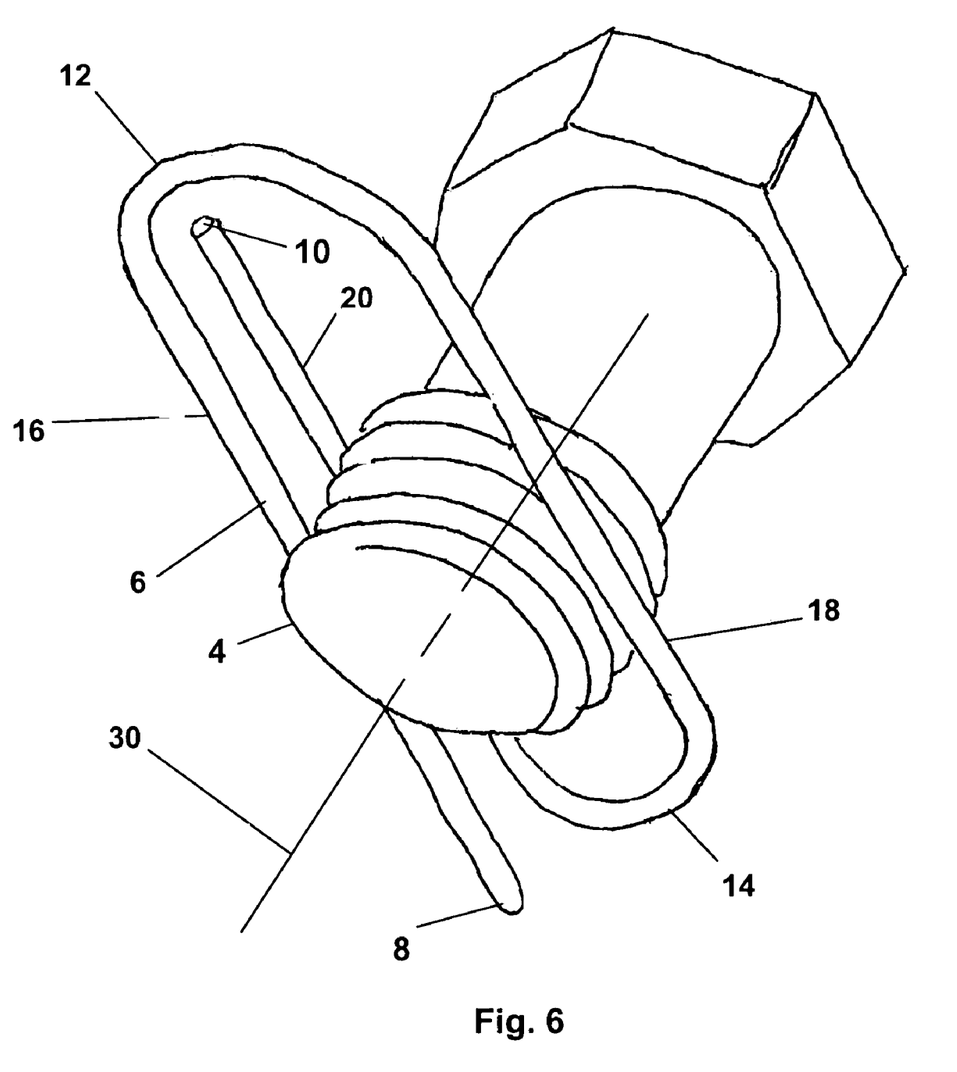
FIG. 6 is a perspective view of an alternative embodiment.

As shown by cross section FIGS. 4 and 5, first location 44, second location 46 and third location 48 are points that together define a location plane 50. Location plane 50 is coincident with the cross sections of the external thread 4 shown by FIGS. 4 and 5. The external thread axis 30 also falls substantially on the location plane 50. The external thread axis 30 divides two of wire portions 16, 18, 20 from the remaining one of the wire portions 16, 18, 20 on the location plane 50. FIGS. 4 and 5 show first wire portion 16 on one side of the external thread axis 30 and second and third wire portions 18, 20 on the other side of the external thread axis 30 on the location plane 50. Any arrangement of first, second, and third wire portions 16, 18, 20 is contemplated by the Invention; for example, the alternative arrangement of FIG. 6 shows first wire portion 16 and third wire portion 20 on one side of the external thread axis 30 and second wire portion 18 on the other side of the external thread axis 30.

As shown by FIGS. 4 and 5, the second and third wire portions 18, 20 have a second wire portion axis 52 and a third wire portion axis 54. The second wire portion axis 52 is separated from the third wire portion axis 54 by a distance 56. Distance 56 is selected to be substantially a whole number multiple of the pitch 28. This allows the second and third wire portions 18, 20 to engage the first flank 40 and second flank 42.

Figure 7:
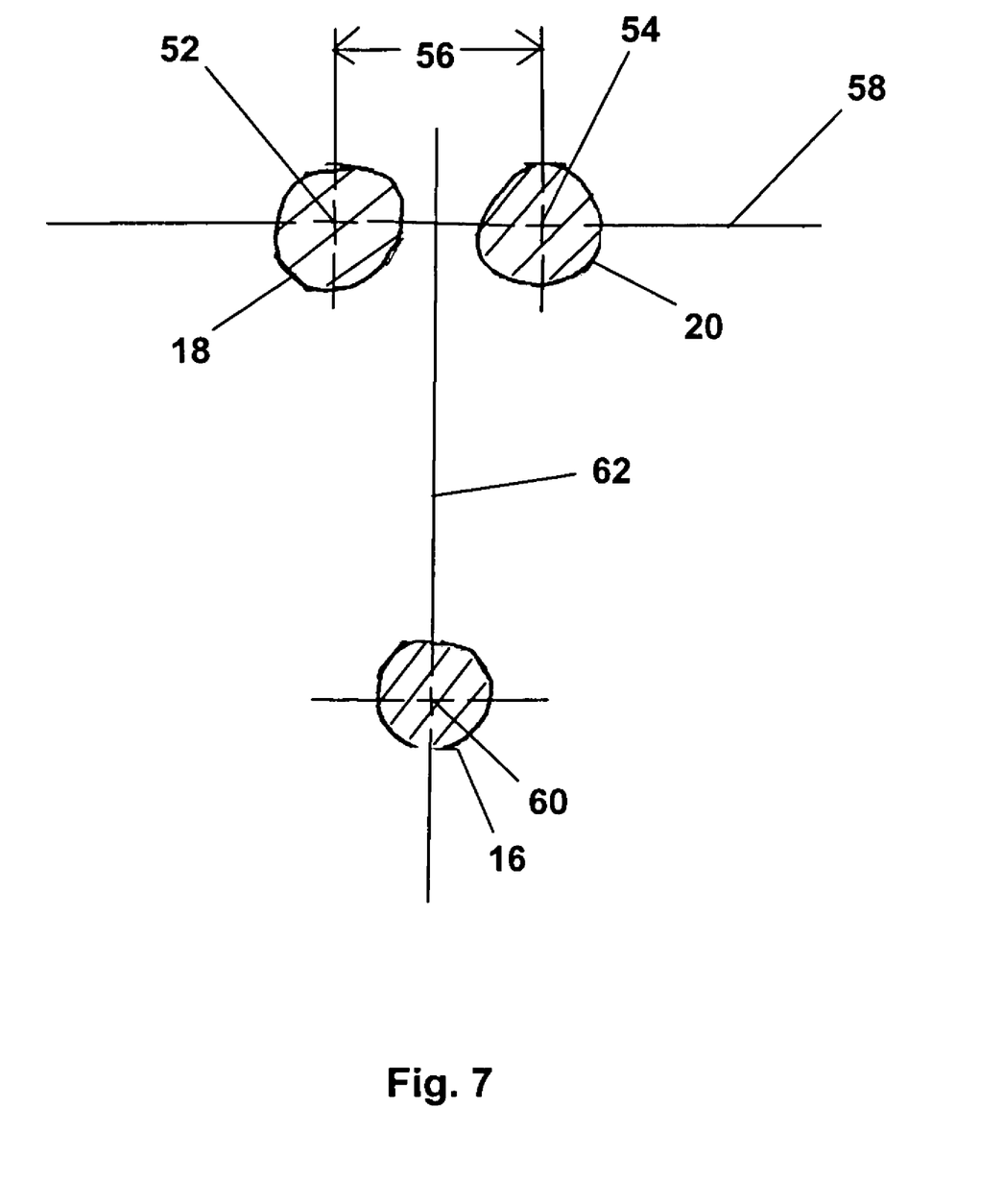
FIG. 7 is a detail cross section of the invention.

As shown by FIG. 7, second wire portion axis 52 and third wire portion axis 54 define a two-wire plane 58. First wire portion 16 has a first wire portion axis 60 that defines a one-wire plane 62 normal to two-wire plane 58. One-wire plane 62 intersects two-wire plane 58 between second wire portion axis 52 and third wire portion axis 54. As shown by FIG. 4, this allows first wire portion 16 to engage first and second flanks 40, 42 intermediate to second and third wire portions 18, 20.

Figure 8:
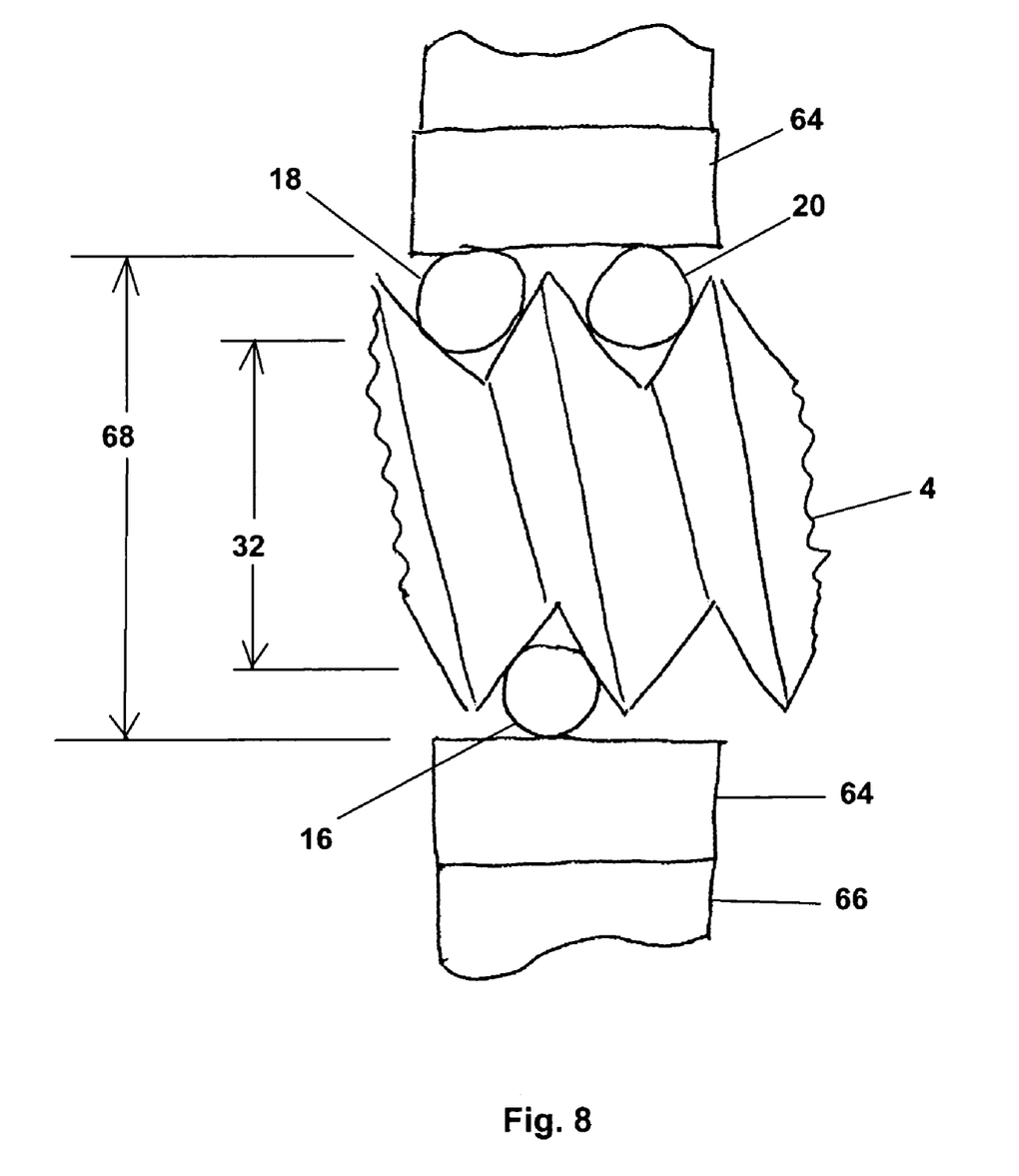
FIG. 8 is a detail side view of the invention in use.

As illustrated by FIG. 8, having first wire portion 16 engage first and second flanks 40, 42 intermediate to second and third wire portions 18, 20 is important so that first, second and third wire portions 16, 8, 20 may in combination engage the anvils 64 of a micrometer, caliper or other measuring device 66. The measuring device 66 measures the outside distance 68 defined by the first, second and third wire portions 16, 18, 20 while the first, second and third wire portions 16, 18, 20 are in engagement with the first and second flanks 40, 42.

The diameters of first, second and third wire portions 16, 18, 20 are not critical provided that the first, second and third wire portions 16, 18, 20 are sized so that they may engage the first and second flanks 40, 42 and further so that the outside distance 68 is greater than the major diameter 32. The effect of variations in the angle defined by the first and second flanks 40, 42 is minimized if the diameters of the first, second and third wire portions 16, 18, 20 are selected so that first, second and third locations 44, 46, 48, shown by FIG. 4, coincide with the sides of the imaginary cylinder having the external thread axis 30 as its center and defined by the pitch diameter 34.

First and second bends 12, 14 and the length of first, second and third wire portions 16, 18, 20 provide resiliency and allow wire apparatus 2 to conform to first and second flanks 40, 42. First and second bends 12, 14 may be configured to act as springs in conjunction with first, second and third wire portions 16, 18, 20 and to apply a predetermined force against first and second flanks 40, 42. The predetermined force may retain the wire apparatus 2 in engagement with the first and second flanks 40, 42 of the external thread 4. The reading of the measuring device 66 is evaluated using techniques well known in the art to determine the pitch diameter 34, also known as the effective diameter. Applicant incorporates by reference herein the information contained within Erik Oberg and F. D. Jones, *Machinery's Handbook*, 11$^{th}$ *Edition*, The Industrial Press, 148 Lafayette Street, New York (1943), pages 1313-1330, relating to the selection of wire sizes and calculation of thread measurements using the three-wire method.

In use, a person will slide the wire apparatus 2 onto an external thread 4 to be measured and into engagement with the first and second flanks 40, 42. The person may then release the wire apparatus 2 and the first and second flanks 40, 42 of the external thread 4 will support the first, second and third wire portions 16, 18, 20. The person therefore is not required to manually hold the wire apparatus 2 (although the person may do so) and is not required to use an external fixture to support the wire apparatus 2.

The person may hold the external thread 4 to be measured in one hand and the measuring device 66 used to measure the outside dimension 68 in the other hand. When used in this manner, the person may achieve accuracies equivalent to those of much larger prior-art three-wire thread gauges that are supported by a table.

The diameters of the first, second and third wire portions 16, 18, 20 and the configurations of first and second bends 12, 14 are selected to accommodate pitches 28 and major diameters 32 of external threads 6 to be measured.

Figure 9:
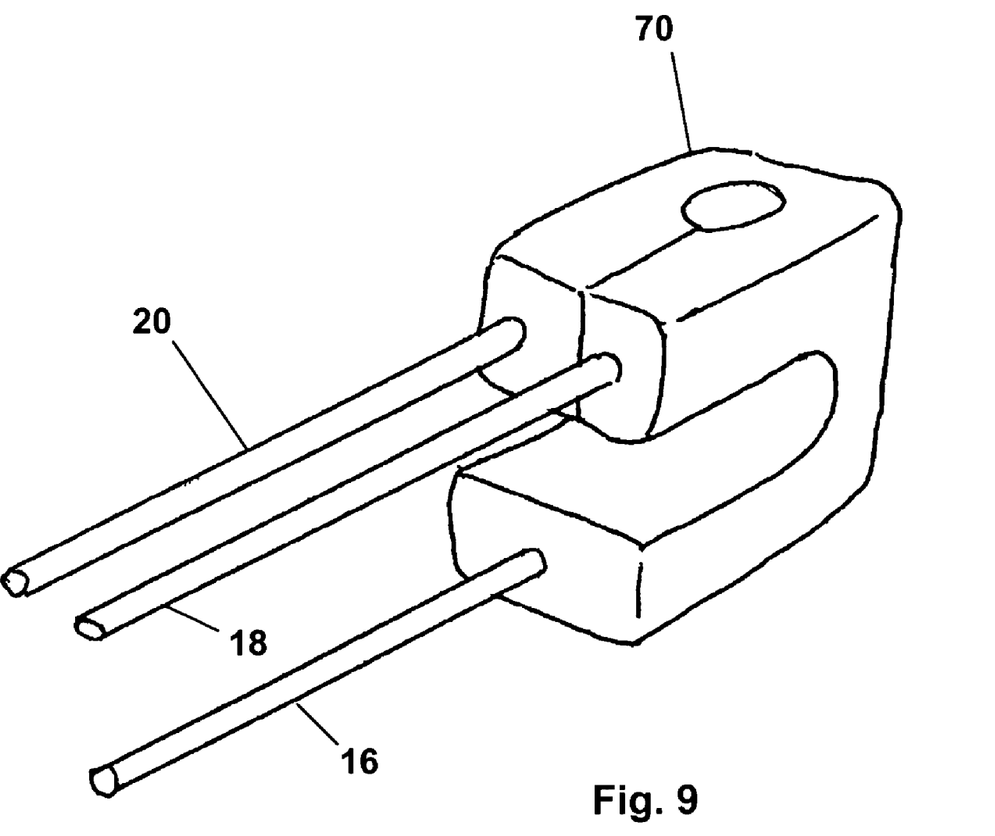
FIG. 9 is a detail view of an alternative embodiment.

FIG. 9 illustrates that a mounting block 70 may be used to hold first, second and third wire portions 16, 18, 20 in a correct configuration for accurate thread measurement. Mounting block 70 should be configured to provide a resilient mounting of first, second and third wire portions 16, 18, 20 so that excessive force is not required to conform first, second and third wire portions 16, 18, 20 to first and second flanks 40, 42 and to obtain measurement of the outside dimension 68 using micrometer 66. Resilient mounting may be achieved by selecting a resilient material, for example a natural or synthetic rubber or other resilient polymer, for all or part of mounting block 70 and by adjusting the dimensions to mounting block 70 to achieve a desired degree of resiliency. In all other respects, the embodiment shown by FIG. 9 is the same as the embodiment discussed above relating to FIGS. 1 through 8.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

We claim:

1. A wire gauge apparatus for measuring an external thread, the apparatus comprising:
   a. a unitary length of a gauge wire, said unitary length of said gauge wire having a first and a second end, said unitary length of said gauge wire defining a first bend and a second bend;
   b. a first wire portion defined by said unitary length of said gauge wire between said first end and said first bend;
   c. a second wire portion defined by said unitary length of said gauge wire between said first bend and said second bend;
   d. a third wire portion defined by said unitary length of said gauge wire between said second bend and said second end; said second and third wire portions being substantially straight and parallel one to another, each of said first, second and third wire portions being configured to selectably engage the external thread, said second and third wire portions engaging the external thread on a first side of the external thread when the apparatus is in engagement with the external thread, said first wire portion engaging the external thread on an opposing side of the external thread when the apparatus is in engagement with the external thread.

2. The apparatus of claim 1 wherein the external thread defines an external thread longitudinal axis and said external thread longitudinal axis is located between said third wire portion and said first wire portion when said first, second and third wire portions are in engagement with the external thread.

3. The apparatus of claim 2 wherein said external thread longitudinal axis is located between said first wire portion and said second wire portion when said first, second and third wire portions are in engagement with the external thread.

4. The apparatus of claim 1 wherein said unitary length of said gauge wire defines an opening for receiving the external thread, said external thread longitudinal axis passing through said opening when said first, second and third wire portions are placed in engagement with the external thread.

5. The apparatus of claim 4, said opening being defined by said first end and by said second bend of said unitary length of said gauge wire.

6. The apparatus of claim 5 wherein the external thread has a pitch and wherein each of said first, second and third wire portions has a wire portion axis, said wire portion axes of said second and third wire portions being separated by a distance, said distance between said wire portion axes of said second and third wire portions being substantially a whole number multiple of said pitch of the external thread.

7. The apparatus of claim 6 wherein said wire portion axes of said second and third wire portions define a two-wire plane, said axis of said first wire portion falls on a one-wire plane, said one-wire plane being normal to said two-wire plane, said one-wire plane intersecting said two-wire plane intermediate to said axes of said second and third wire portions.

8. The apparatus of claim 7 wherein said first, second and third wire portions each has a diameter, said diameters of said first, second and third wire portions being substantially equal.

9. The apparatus of claim 8 wherein said first, second and third wire portions together define an outside dimension when said first, second and third wire portions are in engagement with said external thread, the external thread having a major diameter, said outside dimension being greater than said major diameter when said first, second and third wire portions are in engagement with the external thread.

10. The apparatus of claim 9 wherein the external thread has a pitch diameter, said pitch diameter defining a cylinder longitudinal to said external thread longitudinal axis, said diameter of said first, second and third wire portions being selected so that a location at which a one of said first, second and third wire portions engages the external thread falls substantially on said cylinder when said first, second and third wire portions are in engagement with the external thread.

* * * * *